US010067670B2

(12) United States Patent
Weaver et al.

(10) Patent No.: US 10,067,670 B2
(45) Date of Patent: Sep. 4, 2018

(54) MULTI-SWITCH OPTION SCANNING

(71) Applicant: Google LLC, Mountain View, CA (US)

(72) Inventors: Philip Austin Weaver, Santa Clara, CA (US); Casey John Burkhardt, Mountain View, CA (US)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 14/716,419

(22) Filed: May 19, 2015

(65) Prior Publication Data

US 2016/0342294 A1 Nov. 24, 2016

(51) Int. Cl.
*G06F 3/0488* (2013.01)
*G06F 3/0484* (2013.01)

(52) U.S. Cl.
CPC ........ *G06F 3/04886* (2013.01); *G06F 3/0484* (2013.01); *G06F 3/0488* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 5,126,731 A | 6/1992 | Cromer, Jr. et al. | |
| 5,535,421 A | 7/1996 | Weinreich | |
| 5,594,471 A * | 1/1997 | Deeran | G06F 3/04886 178/18.03 |
| 6,128,010 A | 10/2000 | Baxter et al. | |
| 6,286,064 B1 * | 9/2001 | King | G06F 3/0238 341/22 |
| 6,923,652 B2 | 8/2005 | Kerns et al. | |
| 8,335,993 B1 * | 12/2012 | Tan | G06F 3/04886 715/773 |
| 8,769,427 B2 | 7/2014 | Raman et al. | |
| 2005/0174333 A1 * | 8/2005 | Robinson | G06F 3/0219 345/168 |

(Continued)

FOREIGN PATENT DOCUMENTS

KR 10-2014-0129798 11/2014

OTHER PUBLICATIONS

Roark, "Probabilistic Top-Down Parsing and Language Modeling," Computational Linguistics, 27(2):249-276, Jun. 2001.

(Continued)

*Primary Examiner* — William Bashore
*Assistant Examiner* — Nathan Shrewsbury
(74) *Attorney, Agent, or Firm* — Fish & Richardson P.C.

(57) ABSTRACT

Methods, systems, and apparatus, including computer programs encoded on a computer storage medium, for providing scanning options in user interfaces to facilitate the selection of input options in the provided user interface. In some implementations, a method may include displaying a first user interface including a first set of at least three scanning options. Also, the method may include receiving a selection of a first scanning option of the first set, and displaying a second user interface including a second set of scanning options based on the selection of the first scanning option. Further, the method may include receiving a selection of a first scanning option of the second set, and determining that the first scanning option of the second set defines a single input option that does not result in additional input options, and in response performing a command associated with the single input option.

17 Claims, 6 Drawing Sheets

(56) References Cited

U.S. PATENT DOCUMENTS

| | | |
|---|---|---|
| 2006/0109242 A1 | 5/2006 | Simpkins |
| 2006/0161846 A1* | 7/2006 | Van Leeuwen ...... G06F 3/04842 715/702 |
| 2007/0046641 A1* | 3/2007 | Lim ................... G06F 3/04886 345/173 |
| 2010/0066764 A1* | 3/2010 | Refai ................. G06F 3/04886 345/660 |
| 2010/0164897 A1* | 7/2010 | Morin ................... G06F 3/0237 345/173 |
| 2010/0231522 A1* | 9/2010 | Li ........................ G06F 3/0423 345/169 |
| 2010/0302165 A1* | 12/2010 | Li ........................... G06F 3/038 345/168 |
| 2010/0313120 A1* | 12/2010 | Ho ....................... G06F 3/0237 715/261 |
| 2011/0018812 A1 | 1/2011 | Baird |
| 2011/0157055 A1* | 6/2011 | Tilley ..................... G06F 3/017 345/173 |
| 2011/0276918 A1* | 11/2011 | Bennett ................. G06F 9/4446 715/808 |
| 2011/0310042 A1* | 12/2011 | Breuer ................. G06F 3/0236 345/173 |
| 2011/0320975 A1* | 12/2011 | Breuer ................. G06F 3/0236 715/773 |
| 2012/0016678 A1 | 1/2012 | Gruber et al. |
| 2012/0081297 A1* | 4/2012 | Heo ........................ G06F 3/018 345/171 |
| 2012/0113008 A1* | 5/2012 | Makinen ................. G06F 3/016 345/168 |
| 2014/0098024 A1* | 4/2014 | Paek ....................... G06F 3/023 345/168 |
| 2014/0215398 A1 | 7/2014 | Fleizach et al. |
| 2014/0218297 A1 | 8/2014 | Mortel |
| 2016/0070441 A1* | 3/2016 | Paek ................... G06F 3/04842 715/773 |

OTHER PUBLICATIONS

Wikipedia [online], "DynaVox," Dec. 19, 2014 [retrieved on May 19, 2015]. Retrieved from the Internet: Uook RL<http://en.wikipedia.org/wiki/DynaVox>, 4 pages.

Wikipedia [online], "Huffman coding," May 6, 2015 [retrieved on May 19, 2015]. Retrieved from the Internet: URL<http://en.wikipedia.org/wiki/Huffman_coding>, 9 pages.

International Search Report and Written Opinion in International Application No. PCT/US2016/028603, dated Jun. 30, 2016, 12 pages.

International Preliminary Report on Patentability issued in International Application No. PCT/US2016/028603, dated Nov. 30, 2017, 8 pages.

\* cited by examiner

MULTI-SWITCH OPTION SCANNING

BACKGROUND

Input and selections performed on computing devices, such as smart phones and computers, may be difficult for some individuals. Users of such devices may access various services on the internet, such as mapping application, electronic mail, text messaging, various telephone services, general web browsing, music and video viewing, and similar such services. Some individuals may not have the dexterity and manual capabilities, at all or in certain situations, required to interact with such services as they are presented, and such individuals may need accommodations or other ways to input and interaction with the services.

SUMMARY

This specification describes technologies relating to providing scanning options in user interfaces to facilitate the selection of input options in the provided user interface. In general, one innovative aspect of the subject matter described in this specification includes displaying a first user interface including a first set of at least three scanning options, wherein each of the scanning options in the first set defines a set of input options that is different from each other set of input options defined by the other scanning options in the first set. Also, the method may include receiving a selection of a first scanning option of the scanning options of the first set, and displaying a second user interface including a second set of at least two scanning options based on the selection of the first scanning option from the first set of scanning options, wherein each of the scanning options in the second set defines a set of input options that is different from each other set of input options defined by the other scanning options in the second set. Further, the method may include receiving a selection of a first scanning option of the second set, and determining that the first scanning option of the second set defines a single input option that does not result in additional input options, and in response performing a command associated with the single input option.

Particular embodiments of the subject matter described in this specification can be implemented so as to realize one or more of the following advantages. A user with limited dexterity and manual capabilities is able to provide input and commands to a user device by selecting scanning options that group input options for a particular user interface. The method and system also applies to each application and other components of the user device, and need not be individually tuned or otherwise require application-specific parameters.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems and techniques for receiving user input on a computing device in a manner that requires very little dexterity and/or manual capabilities. Input options for a particular user interface may be grouped into, for example, three or more scanning options. The selection of a scanning option may be performed at a switch component that may be part of or separate from the user device, and the selected scanning option by the user should include the input option that the user wishes to input. After a scanning option is received, another user interface, including another set of scanning options, may be provided based on the selection of the first scanning option from the first set of scanning options. Each of the scanning options in this other set defines a set of input options that may be different from each other set of input options defined by the other scanning options in the second set. However, when a selected scanning option includes a single input option, a command associated with the single input option may be performed.

In some implementations, the second set of scanning options defines a set of input options that is a proper subset of the set of input options defined by the first selected scanning option of the first set. For example, when a keyboard scanning option for the set of input options of [A, B, C, D, E, F] are selected, the second sets of scanning options may be {A, B}, {C, D}, and {E, F}. Alternatively, input options in the second set can be different from the input options in the first set. For example, a first set of scanning options may correspond to different menu commands. The selection of a particular first scanning option, e.g., "File," may then result in a set of second scanning options {New, Open, Save}, {Print, Share}, and {Export, Close}.

These features and additional features are described in more detail below.

Figure 1:
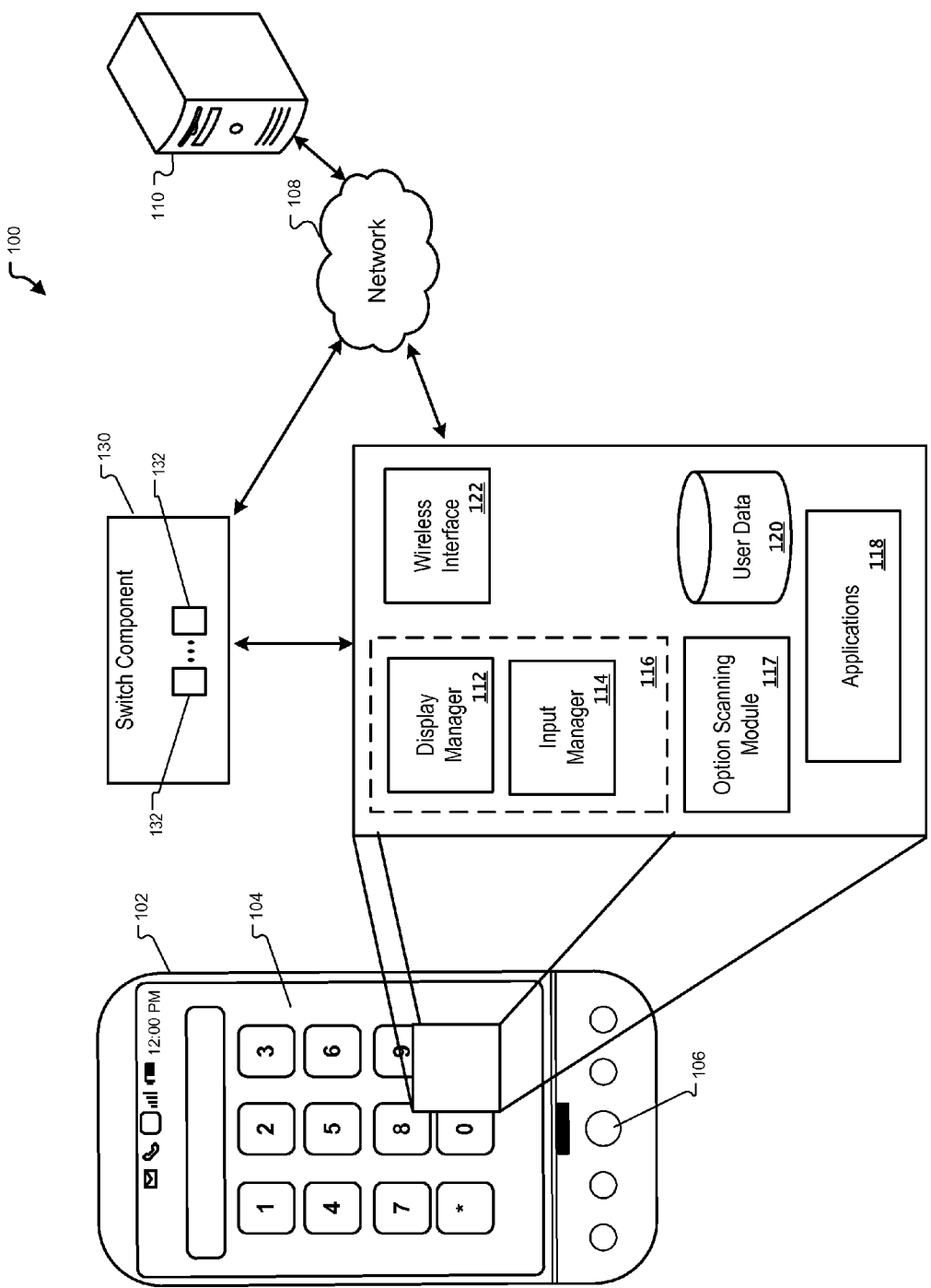
FIG. 1 is a block diagram of an example environment for implementing scanning options to select input options.

FIG. 1 is a block diagram of a system 100 for implementing scanning options to select particular input options. In general, the system is represented by a user device 102, such as a smart phone, computer, laptop, tablet, or other devices having a display 104, which may be a touchscreen display. In addition, the device 102 may have alternative input mechanisms, such as selectable buttons 106, in addition to a physical keyboard that can be uncovered by sliding the display outward.

The user device 102 may communicate via a wireless display 122, through a network 108 such as the internet and/or a cellular network, with servers 110. For example, the user device 102 may carry telephone calls through the telephone network or using VOIP technologies in familiar manners. Also, the user device 102 may transmit regular data over the internet, such as in the form of HTTP requests directed at particular web sites, and may receive responses, such as in the form of mark-up code for generating web pages, as media files, as electronic messages, or in other forms.

A number of components running on one or more processors installed in the user device 102 may enable a user to have simplified input on the display 104. For example, a device manager 116 may manage interaction with the display 104, and may include a display manager 112 and an input manager 114. The display manager 112 may manage what information is shown to a user via display 104. For example, an operating system on the user device 102 may employ display manager 112 to arbitrate access to the display 104 for a number of applications 118 running on the user device 102. In one example, the user device 102 may display a number of applications, each in its own window, and the display manager 112 may control what portions of each application are shown on the display 104.

The input manager 114 may control data that is received from a user via the display 104 or other input mechanisms. For example, the input manager 114 may coordinate with the display manager 112 to identify and sort the provided input. In addition, the input manager 114 may determine which application or applications should be provided with the input. For example, when the input is provided within a text entry box of an active application, data entered in the box may be made available to that application. Likewise, applications may subscribe with the input manager so that they may be passed information entered by a user in appropriate circumstances.

An option scanning module 117 may also be provided, which may be a program module or other form of application, such as a widget or gadget, that serves as an intermediary between other applications on a device and the device manager 116. Applications 118 may initially register with the option scanning module 117 when they are originally launched, but such a configuration is not required. In some implementations, the device manager 116 may provide display information and input options to the option scanning module 117, which may then be passed to other services (e.g., accessibility services, devices, or applications). In certain embodiments, the applications 118 may identify the different user interfaces of the applications and input options for each of the user interfaces. Using a known API, for example, the application may submit or enable the option scanning module 117 to access an array or other data structure of user interfaces and input options for each of the user interfaces.

The option scanning module 117 may then interact with the device manager 116, such as by registering itself with the device manager 116. Option scanning module 117 may map or store each input option for each user interface with a scanning option to be provided with that user interface. However, a mapping or storing for each application 118 and user interface of the application 118 is not required. The option scanning module 117 may interact with the device manager 116 when a user interface is provided at the device manager 116 to include the scanning options along with the user interface, which may be provided by scanning option indicators that highlight, outline, bracket, read aloud, or otherwise identify the input options for each scanning option of the particular user interface. The input options associated with each scanning option may be different from one another where each scanning option does not include all of the same input options (e.g., a first scanning option may include letters "A," "S," and "D," and be different from a second scanning option that include letters "D," "F," and "G."). Additionally, in some implementations, the input options associated with each scanning option may be mutually exclusive from one another in that each scanning option does not include an input option that is also included in another scanning option.

In some implementations, the scanning option grouping of input options for a particular user interface may be based on the location of the input options on the user device, a user history of input option selections for the user interface, probabilities of user selection of input options, or selection rates of user selection of input options, among others. The user history of input option selections may be based on the particular user of the user device 102, a subset of users that interact with an option scanning module 117, or all the users that interact with an option scanning module 117. The selection rate may factor in the user history to determine how often each input option is selected in the particular user interface.

Upon the user of the user device 102 making a selection of a scanning option, another user interface may be provided. Along with that user interface, the option scanning module 117 may provide a selection of scanning options for the input options of that user interface. The user interface may be the same underlying user interface that was previously presented (e.g., a keyboard of a keyboard application), but the other user interface may include different scanning options than the previous user interface, e.g., sub-menus of a selected menu item. Also, the other user interface may be a different underlying user interface than was previously presented. The option scanning module 117 may interact with the device manager 116 when the user interface is provided after the user selection at the device manager 116 to include the scanning options along with the user interface, which may be provided by scanning option indicators. In some implementations, more user interfaces may be provided as scanning options are selected until the selected scanning option corresponds with a single input option, and a command associated with the single input option may be performed, as described further below.

In some implementations, the input options associated with different user interfaces may be stored at the option scanning module 117, server 110, switch component 130, or other portion of the user device 102, or a combination thereof. Additionally, not all of the input options and different user interfaces are required to be stored. For some of the different user interfaces, the option scanning module 117 may determine the input options when device manager 116 has received the information associated with the user interface to be displayed, and the option scanning module 117 may determine and provide scanning options for the input options of the user interface to be displayed. The input options for one or more user interface may be grouped into three or more scanning options.

In implementations where input options for user interfaces are stored, the data may map each of the input options for each of the user interfaces to a particular scanning option. In some implementations, the input options for each scanning option may change or be modified. Additionally, the mapping of each of the input options for each of the user interfaces to a particular scanning option may be formed in a data tree structure that provides a hierarchy of input options for the user interfaces. For example, if the provided user interface is a virtual keyboard, and a first scanning option includes input options for letters "A," "S," "D," "F," and "T," and a second scanning option includes input options for letter "G," "H," "J," and "K," the scanning options may adjust or modify the input options (e.g., letters) that are associated with each particular scanning option. The first scanning option may be modified to include only letters "A" and "S," add letter "G," or include different input options than initially mapped to. The adjustment or modification may occur based on selection rates of input options, user preference, user history, or any other mechanism. The option scanning module 117 and/or server 110 may receive data to indicate the statistics, preferences, and user history of the input options and scanning options, and option scanning module 117 and/or server 110 may then modify the mapping of the input options associated with the scanning options.

For example, an adjustment or modification may occur in order to provide the user of the user device 106 with a more efficient way to select the input option to provide a command to the user device 106 (i.e., arrive at a single input option more frequently). Based on the example above, if after the user selected the first scanning option, and the next scanning options were "A" and "S," "D" and "F," and "T," and the data indicating the statistics, preferences, and user history showed that users were selecting input option "A" 40% of the time, given the first scanning option, then the option scanning module may modify this level of scanning options for only input option "A" to be associated with a particular scanning option. Such a modification would make the scanning option process more efficient, in this example, because when the user selects the scanning option for only input option "A," then the selected scanning option corresponds with a single input option and a command associated with the single input option may be performed.

Scanning options may be selected at the user device 102 (e.g., via a touchscreen of the display 104 or buttons 106) or at a switch component 130, among other ways. The switch component 130 may be part of the user device 102 (e.g., shown in display 104 for selection via a touch screen or buttons 106) or a separate device with a wired or wireless connection to the user device 102. Wireless connections to the user device 102 may include USB (which may also be wired), RF, Wi-Fi, Bluetooth, or Internet, among others. Switch component 130 may include selecting mechanisms for scanning options, which may include one or more switches 132 that correspond with scanning options.

In some implementations, when there are three scanning options, there may be one switch 132 designated for each of the scanning options. However, such a configuration is not required, and in other implementations, there may be more or fewer switches 132 than scanning options. For example, if there are two switches 132 provided for three scanning options, the third scanning option may be selected at the switch component 130 by a selection pattern. A selection pattern may be a single-click, double-click, short click, long click, selecting two or more switches at a time, among others. Based on the current example, a first scanning option may be selected by selecting a first switch, a second scanning option may be selected by selecting a second switch, and a third scanning option may be selected by a long click at the first switch (e.g., longer than three seconds), or alternatively, by selecting the first switch and second switch at the same time. In some implementations, the selection patterns for the switch component 130 may be default selection patterns or determined by the option scanning module 117. However, the user of the user device 102 and switch component 130 may be able to adjust or modify the selection patterns for the user. The switches 132 may be a button, lever, or area of a touch screen, among others.

When a selection of a scanning option is made at the switch component 130, the selection may be provided to the option scanning module 117 in order for the scanning option element 117 to communicate with the device manager 116 and other portions of user device 102 to implement the selection, and provide the requested input options, user interfaces, scanning options, and/or command.

A user data database 120 may also be provided to store information about particular user preferences or parameters. For example, the database 120 may store an identifier of an application that is to implement the option scanning module 117 in various contexts. As one example, a web browser application may be set by default to implement the option scanning module 117 and scanning options when used, and the web browser application may implement a keyboard application that also implements the option scanning module 117 and scanning options. The user data database 120 may also include information such as selection rates for particular scanning options, user preferences for selection of scanning options, applications that implement the option scanning module 117, and other relevant data needed to provide an alternative mechanism for providing input.

Figure 2:
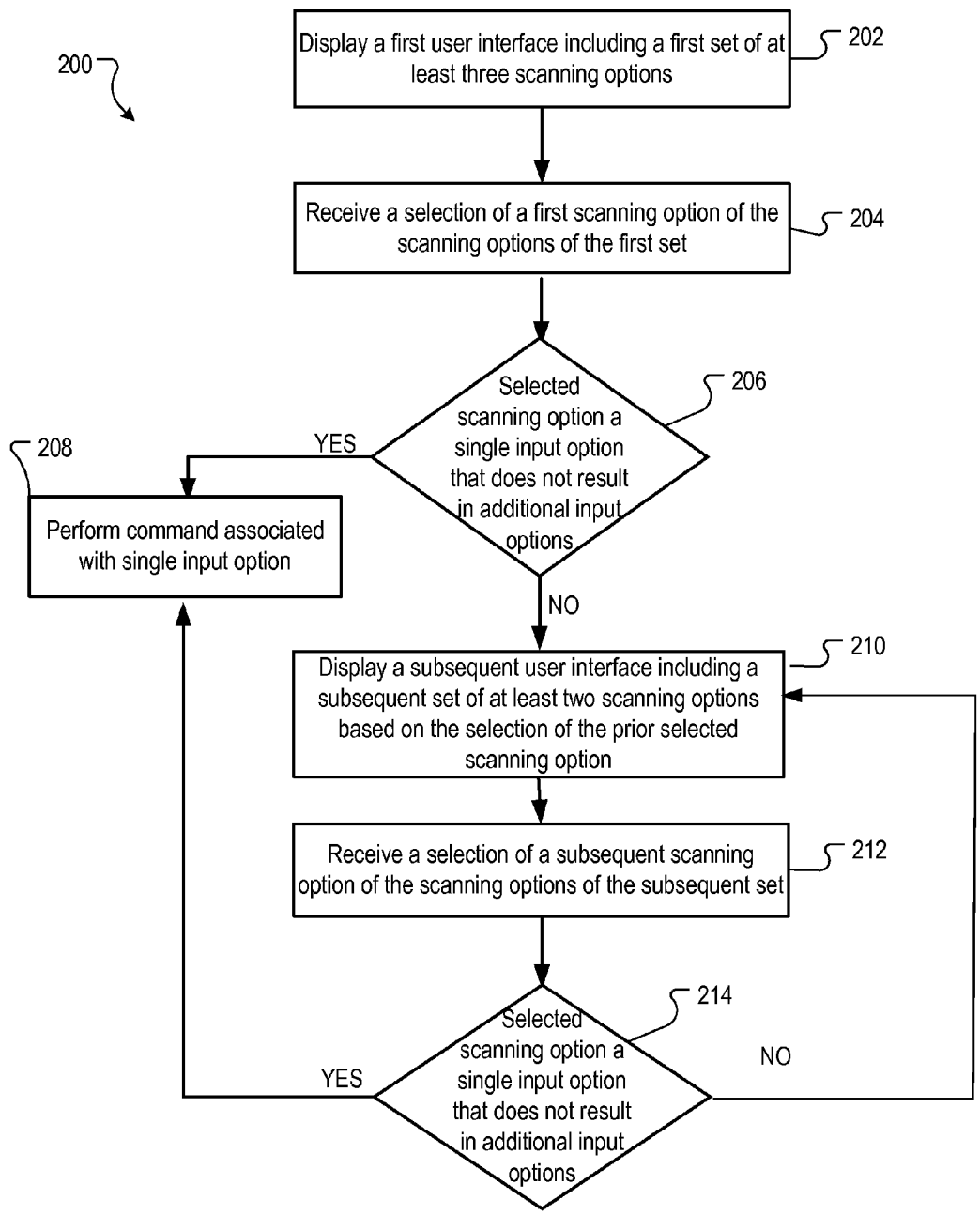
FIG. 2 is a flow diagram of an example process for providing scanning options to implement input at a user device.

FIG. 2 is a flow diagram of an example process 200 for using scanning options to implement a command a user device 102. The process 200 can, for example, be implemented by a user device 102, option scanning module 117, and a switch component 130. In some implementations, the operations of the example process 200 can be implemented as instructions stored on a non-transitory computer readable medium, where the instructions cause a data processing apparatus to perform operations of the example process 200. The process of FIG. 2 is described in the context of menu selections. A similar process for keyboard inputs is described with reference to FIGS. 3A-3D.

A first user interface including a first set of at least three scanning options may be displayed at a user device (202). Each of the scanning options in the first set may define a set of input options that is different from each other set of input options defined by the other scanning options in the first set. For example, a web browser application user interface that is shown in display 104 of the user device 102 may include input options of minimize the web browser, maximize the web browser, close the web browser, a ribbon including web browser application options, a search input, an HTTP address input, and selection or links at the web browser application page user interface. The first set of at least three scanning options may group each of the input options, and each group of input options may be associated with a different scanning option. In some implementations, each of the input options may be enclosed or highlighted as the same color or pattern as the other input options in the particular scanning option.

A selection of a first scanning option of the scanning options of the first set is received (204). For example, if the minimize web browser, maximize web browser, web browser application options (e.g., History, Settings, Tools, Favorites) and HTTP address input are input options of a scanning option, and the user of the user device 102 selections that particular scanning option (e.g., via the switch component 130), then the user device 102 and option scanning module 117 may receive the selection.

A determination may be made as to whether the selected scanning option is a single input option that does not result in additional input options (206). Based on the current example, when a selection of the scanning option occurred, there are many different input options that may be further selected by the user, so there is not a single input option.

However, for example, if the only input option for the selected scanning option was the HTTP address input, then the user device 102 and option scanning module 117 may initiate the performance of the command associated with the single input option (208), which may be to provide a cursor and text input at the HTTP address input.

When there is more than a single input option for the selected scanning option, a second user interface including a subsequent set of at least two scanning options based on the selection of the selected scanning option from the prior set of scanning options may be displayed (210). For example, after selection of a first scanning option with more than one single input option, a second set of scanning options is displayed. Each of the scanning options in the second set may define a set of input options that is different from each other set of input options defined by the other scanning options in the second set, and each of the set of input options may be mutually exclusive from each other and/or a proper subset of the set of input options defined by the first scanning option of the first set. For example, a second user interface may be provided that includes the input options of the selected scanning option of the first user interface. Based on the previous example, the input options of minimize web browser, maximize web browser, web browser application options, and HTTP address input may be grouped, and each group of input options may be associated with a different scanning options. The input parameters of minimize web browser, maximize web browser, and HTTP address input may be grouped and associated with one scanning option while the different web browser application options may be grouped into one or more other scanning option.

A selection of a second scanning option of the scanning options of the second set is received (212). Based on the previous example, the user of the user device 102 may select (e.g., via the switch component 130) the scanning option associated with the input options of minimize web browser, maximize web browser, web browser application options, and HTTP address input, and the user device 102 and option scanning module 117 may receive the selection.

Again, a determination may be made as to whether the selected scanning option is a single input option that does not result in additional input options (214). Based on the current example, when a selection of the scanning option occurred, there are three different input options that may be further selected by the user, so there is not a single input option. However, for example, if the only input option for the selected scanning option was the HTTP address input, then the user device 102 and option scanning module 117 may initiate the performance of the command associated with the single input option (208), which may be to provide a cursor and text input at the HTTP address input.

Further, when there is more than a single input option for the selected scanning option, the process 200 returns to step 210.

Figure 3A:
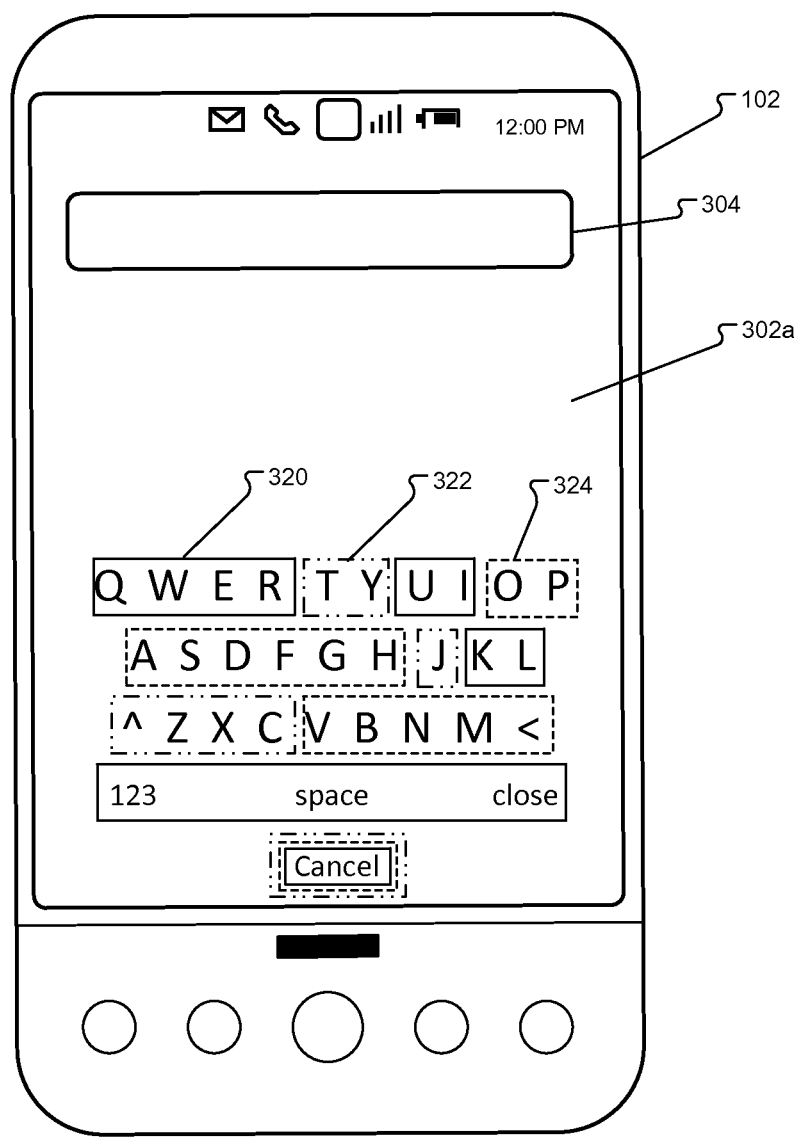
FIG. 3A is an illustration of a user interface in which a keyboard application is displayed along with scanning options for the input options of the keyboard.

The process 200 is also described in the context of FIGS. 3A-3D. In particular, FIG. 3A is an illustration of a user interface 302a at a user device 102 in which a keyboard application is displayed along with scanning options for the input options of the keyboard. The keyboard application may be provided along with other applications (e.g., when text input is selected or required at the other application like a web browser, email, or calendar, among others). The user of the user device 102 may input text in input field 304, and in the current implementation, there are three scanning options for the input options. For example, in the current example, a user may wish to input the letter H. As seen in FIG. 3A, a first scanning option indicated by a first outline 320 include Q, W, E, R, U, I, K, L, (123) (which may present additional inputs for the keyboard), space, and close. A second scanning option indicated by a second outline 322 includes T, Y, J, ˆ (upper case/lower case), Z, X, and C. Finally, a third scanning option indicated by a third outline 324 include O, P, A, S, D, F, G, H, V, B, N, M, and <(delete). Additionally, as shown by way of example in FIG. 3A, a "Cancel" option is included in each of the input options of the first scanning option, second scanning option, and third scanning option. In the current example, as the user of the user device 102 would like to input "H," the user may select the third scanning option, indicated by the dashed outline. The selection of a scanning option may be performed at switch component 130, as previously discussed. The indicators for the scanning options at the user interface 302a may be different outlines, colors, highlights, or any other way of indicating the different scanning options.

Figure 3B:
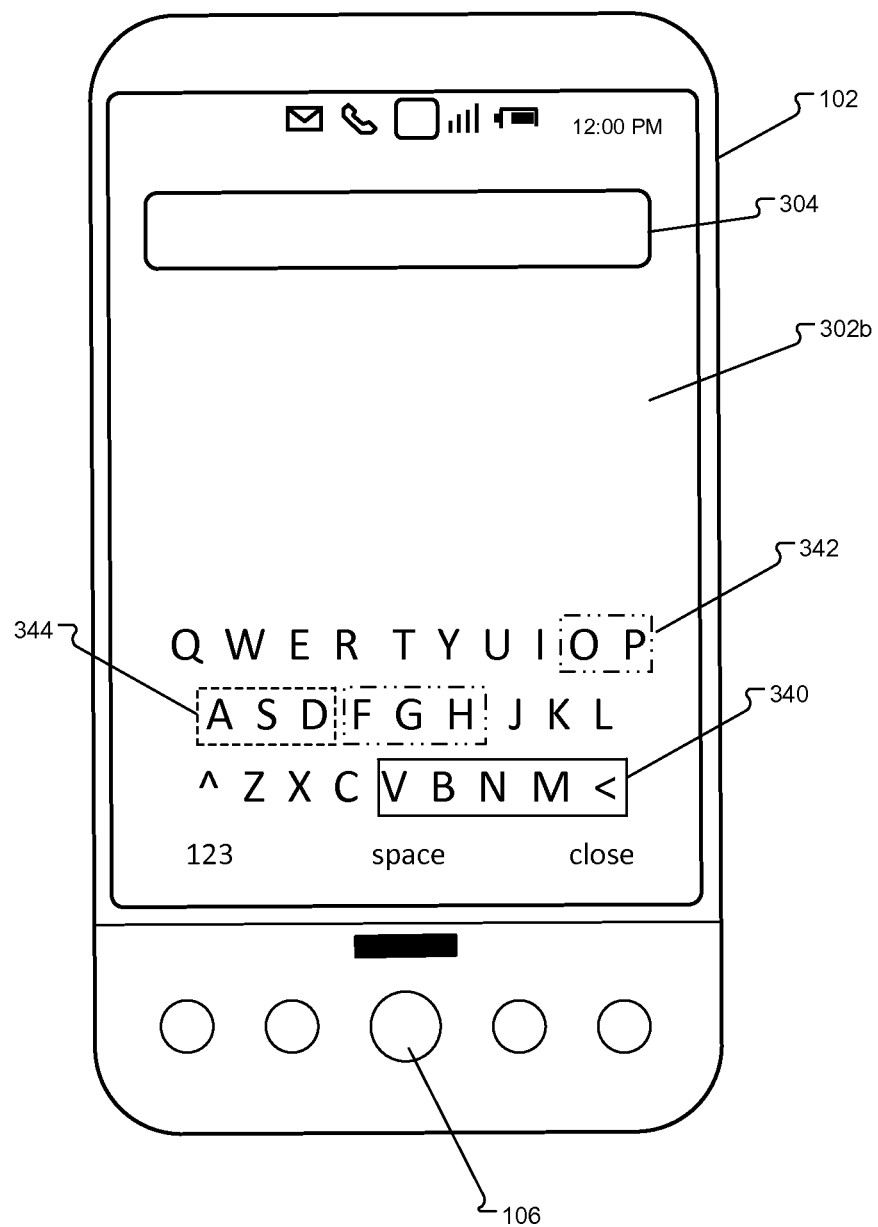
FIG. 3B is an illustration of a user interface that includes the input options of a selected scanning option of the user interface of FIG. 3A grouped into three scanning options.

In FIG. 3B, after the user of the user device 102 selects the third scanning option, indicated by the third outline 324, a user interface 302b is provided that includes the input options of the third scanning option in the first user interface (302a) further grouped into three scanning options. A first scanning option indicated by a first outline includes V, B, N, M, and <(delete). A second scanning option indicated by a second outline 342 includes O, P, F, G, and H, and a third scanning option indicated by a third outline 344 includes A, S, and D. In the current example, as the user of the user device 102 would like to input "H," the user may select the second scanning option, indicated by the dash-dot-dot outline. Although the "Cancel" option is not shown in FIGS. 3B, 3C, and 3D, the option may be included in other embodiments and be included in the available first scanning option, second scanning option, and/or third scanning option.

Figure 3C:
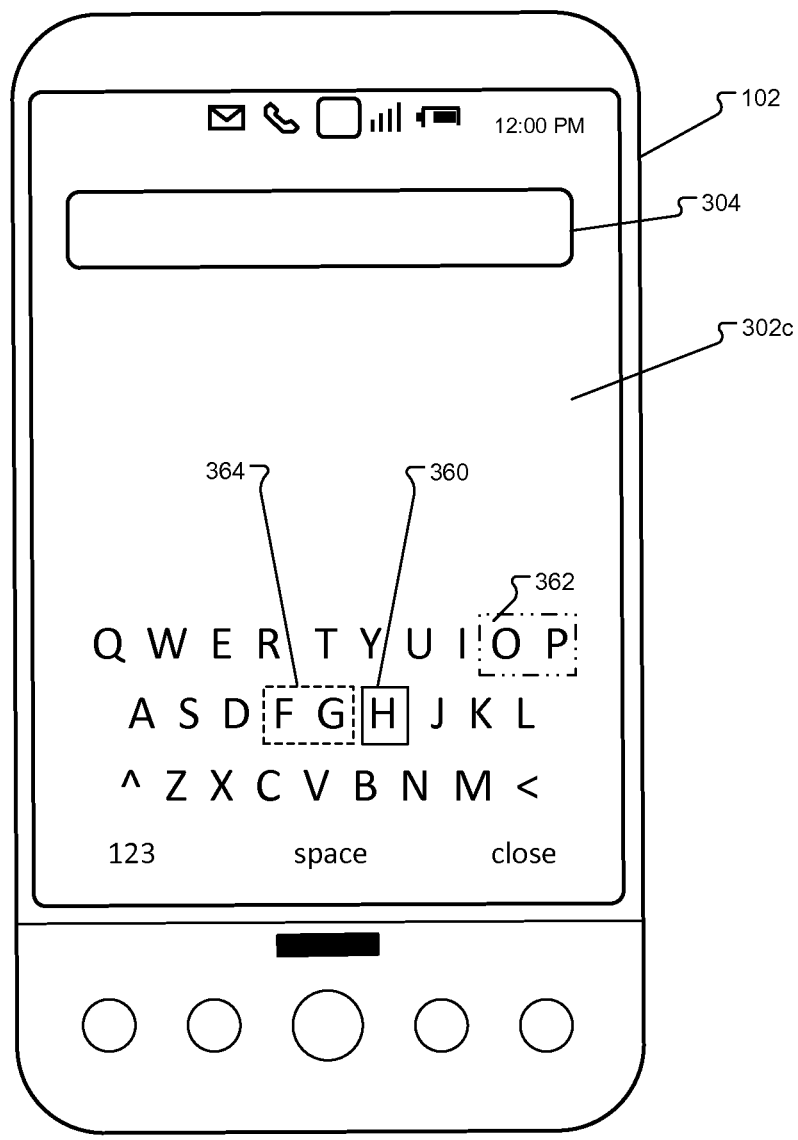
FIG. 3C is an illustration of a user interface that includes the input options of a selected scanning option of the user interface of FIG. 3B grouped into three scanning options.

In FIG. 3C, after the user of the user device 102 selects the second scanning option, indicated by the second outline 342 of FIG. 2, a user interface 302c is provided that includes the input options of the second scanning option in the second user interface (302b) further grouped into scanning options. A first scanning option indicated by a first outline 360 includes H. A second scanning option indicated by a second outline 362 includes O and P, and a third scanning option indicated by a third outline 364 includes F and G. In the current example, as the user of the user device 102 would like to input "H," the user may select the first scanning option, indicated by the first outline 360. Further, as the selected scanning option includes a single input option, the command of inputting the letter "H" in the input field may be complete.

Figure 3D:
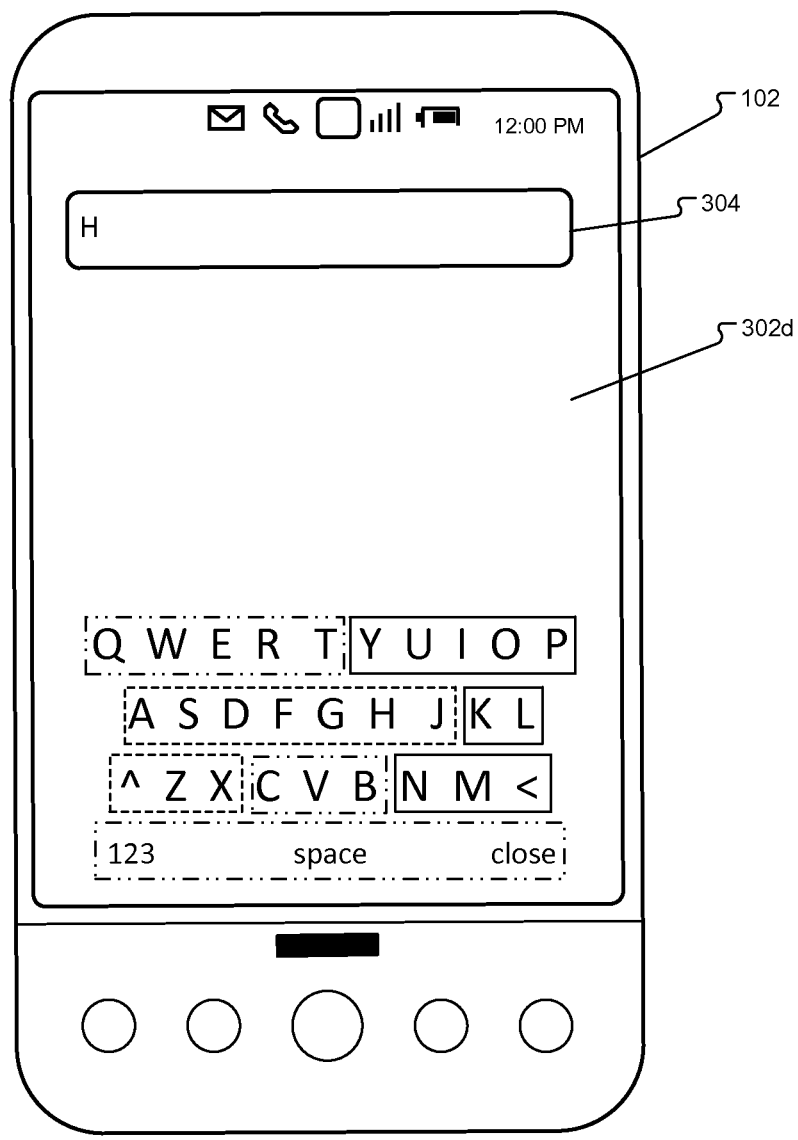
FIG. 3D is an illustration of a user interface in which a keyboard application is displayed after input of a command along with scanning options for the input options of the keyboard.

In FIG. 3D, a user interface 302d is provided that includes the letter "H" input in the input field 304, and all of the input options of the keyboard application are provided after the input occurred. In some implementations, the scanning options for the groups of input options may be the same; however, in other implementations the scanning options for the groups of input options may change. For example, depending on the input provided in input field 304, the option scanning module 117 may determine to group the input options in different ways to attempt to provide the user of the user device 102 the fewest number of iterations of scanning option selecting to input a character in input field 304. Based on the previous example, after the letter "H" is input in input field 304, the option scanning module 117 may regroup the input options (differently than FIG. 3A), as seen in FIG. 3D, based on statistics and user input related to the letters that are shown to be input after the letter "H," and the next letter of words that start with "H."

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical display or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    displaying, by a user device, a first user interface including a first set of at least three scanning options, wherein each of the scanning options in the first set defines a set of input options that are mutually exclusive of each other set of input options defined by the other scanning options in the first set, each scanning option in the first set is visually distinguished from each other scanning options in the first set by a respective visual indicator that indicates the scanning option and the input options defined by the scanning option, and the input options corresponding to the scanning options in the first set are displayed concurrently with each other;
    receiving, at the user device, a selection of a first scanning option of the scanning options of the first set;
    displaying, by the user device, a second user interface, including a second set of at least two scanning options based on the selection of the first scanning option from the first set of scanning options, wherein each of the scanning options in the second set defines a set of input options that are mutually exclusive of each other set of input options defined by the other scanning options in the second set, each scanning option in the second set is visually distinguished from each other scanning option in the second set by a respective visual indicator that indicates the scanning option and the input options defined by the scanning option, the input options of the scanning options in the second set are the input options of the selected first scanning option, and the input options corresponding to the scanning options in the second set are displayed concurrently with each other;
    receiving, at the user device, a selection of a first scanning option of the second set; and
    determining that the first scanning option of the second set defines a single input option that does not result in additional input options, and in response performing, at the user device, a command associated with the single input option.

2. The computer-implemented method of claim 1, wherein displaying a first user interface including a first set of at least three scanning options further comprises:
    determining selectable input options of the user interface at the user device;
    grouping the input options into sets, wherein each set of input options is associated with a different scanning option;
    providing the first user interface including scanning option indicators uniquely identifying the input options associated with each of the scanning options.

3. The computer-implemented method of claim 2, wherein mapping each of the input options in each set of input options with the associated scanning option, further comprises:
    determining, for each of the input options, a subsequent set of input options that are provided upon selection of each of the input options of each set of input options;
    mapping each subsequent set of input options to the input option that causes the subsequent set of input options to be provided upon selection of that input option; and
    storing the mapping of each subsequent set of input options to the input option that causes the subsequent set of input options to be provided upon selection of that input option.

4. The computer-implemented method of claim 2, further comprising:
determining a selection rate of each input option; and
mapping each of the input options with one of the scanning options based on the selection rate.

5. The computer-implemented method of claim 1, wherein the selection of each scanning option is performed at a switch component that includes a different selecting mechanism for each of the scanning options provided in each set.

6. The computer-implemented method of claim 1, wherein each of the scanning options in the second set defines a set of input options that is a proper subset of the set of input options defined by the first scanning option of the first set.

7. A system, comprising:
a data processing apparatus; and
software stored in non-transitory computer readable storage medium storing instructions executable by the data processing apparatus and that upon such execution cause the data processing apparatus to perform operations comprising:
  displaying, by a user device, a first user interface including a first set of at least three scanning options, wherein each of the scanning options in the first set defines a set of input options that are mutually exclusive of each other set of input options defined by the other scanning options in the first set, each scanning option in the first set is visually distinguished from each other scanning options in the first set by a respective visual indicator that indicates the scanning option and the input options defined by the scanning option, and the input options corresponding to the scanning options in the first set are displayed concurrently with each other;
  receiving, at the user device, a selection of a first scanning option of the scanning options of the first set;
  displaying, by the user device, a second user interface, including a second set of at least two scanning options based on the selection of the first scanning option from the first set of scanning options, wherein each of the scanning options in the second set defines a set of input options that are mutually exclusive of each other set of input options defined by the other scanning options in the second set, the input options defined by each scanning option in the second set are visually distinguished from the input options defined by other scanning options in the second set, the input options of the scanning options in the second set are the input options of the selected first scanning option, and the input options corresponding to the scanning options in the second set are displayed concurrently with each other;
  receiving, at the user device, a selection of a first scanning option of the second set; and
  determining that the first scanning option of the second set defines a single input option that does not result in additional input options, and in response performing, at the user device, a command associated with the single input option.

8. The system of claim 7, wherein displaying a first user interface including a first set of at least three scanning options further comprises:
  determining selectable input options of the user interface at the user device;
  grouping the input options into sets, wherein each set of input options is associated with a different scanning option;
  providing the first user interface including scanning option indicators uniquely identifying the input options associated with each of the scanning options.

9. The system of claim 8, wherein mapping each of the input options in each set of input options with the associated scanning option, further comprises:
  determining, for each of the input options, a subsequent set of input options that are provided upon selection of each of the input options of each set of input options;
  mapping each subsequent set of input options to the input option that causes the subsequent set of input options to be provided upon selection of that input option; and
  storing the mapping of each subsequent set of input options to the input option that causes the subsequent set of input options to be provided upon selection of that input option.

10. The system of claim 8, further comprising:
determining a selection rate of each input option; and
mapping each of the input options with one of the scanning options based on the selection rate.

11. The system of claim 7, wherein the selection of each scanning option is performed at a switch component that includes a different selecting mechanism for each of the scanning options provided in each set.

12. The system of claim 7, wherein each of the scanning options in the second set defines a set of input options that is a proper subset of the set of input options defined by the first scanning option of the first set.

13. A non-transitive computer storage medium encoded with a computer program, the program comprising instructions that when executed by data processing apparatus cause the data processing apparatus to perform operations comprising:
  displaying, by a user device, a first user interface including a first set of at least three scanning options, wherein each of the scanning options in the first set defines a set of input options that are mutually exclusive of each other set of input options defined by the other scanning options in the first set, each scanning option in the first set is visually distinguished from each other scanning options in the first set by a respective visual indicator that indicates the scanning option and the input options defined by the scanning option, and the input options corresponding to the scanning options in the first set are displayed concurrently with each other;
  receiving, at the user device, a selection of a first scanning option of the scanning options of the first set;
  displaying, by the user device, a second user interface, including a second set of at least two scanning options based on the selection of the first scanning option from the first set of scanning options, wherein each of the scanning options in the second set defines a set of input options that are mutually exclusive of each other set of input options defined by the other scanning options in the second set, the input options defined by each scanning option in the second set are visually distinguished from the input options defined by other scanning options in the second set, the input options of the scanning options in the second set are the input options of the selected first scanning option, and the input options corresponding to the scanning options in the second set are displayed concurrently with each other;
  receiving, at the user device, a selection of a first scanning option of the second set; and
  determining that the first scanning option of the second set defines a single input option that does not result in additional input options, and in response performing, at the user device, a command associated with the single input option.

14. The computer storage medium of claim 13, wherein displaying a first user interface including a first set of at least three scanning options further comprises:

determining selectable input options of the user interface at the user device;

grouping the input options into sets, wherein each set of input options is associated with a different scanning option;

providing the first user interface including scanning option indicators uniquely identifying the input options associated with each of the scanning options.

15. The computer storage medium of claim 14, wherein mapping each of the input options in each set of input options with the associated scanning option, further comprises:

determining, for each of the input options, a subsequent set of input options that are provided upon selection of each of the input options of each set of input options;

mapping each subsequent set of input options to the input option that causes the subsequent set of input options to be provided upon selection of that input option; and storing the mapping of each subsequent set of input options to the input option that causes the subsequent set of input options to be provided upon selection of that input option.

16. The computer storage medium of claim 14, further comprising:

determining a selection rate of each input option; and mapping each of the input options with one of the scanning options based on the selection rate.

17. The computer storage medium of claim 13, wherein the selection of each scanning option is performed at a switch component that includes a different selecting mechanism for each of the scanning options provided in each set.

* * * * *

UNITED STATES PATENT AND TRADEMARK OFFICE
CERTIFICATE OF CORRECTION

| | | |
|---|---|---|
| PATENT NO. | : 10,067,670 B2 | Page 1 of 1 |
| APPLICATION NO. | : 14/716419 | |
| DATED | : September 4, 2018 | |
| INVENTOR(S) | : Weaver et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this
Twenty-third Day of April, 2019

Andrei Iancu
*Director of the United States Patent and Trademark Office*